June 27, 1961     E. C. HEARD     2,990,193
AUTOMOBILE STABILIZER
Filed April 29, 1958     2 Sheets-Sheet 2
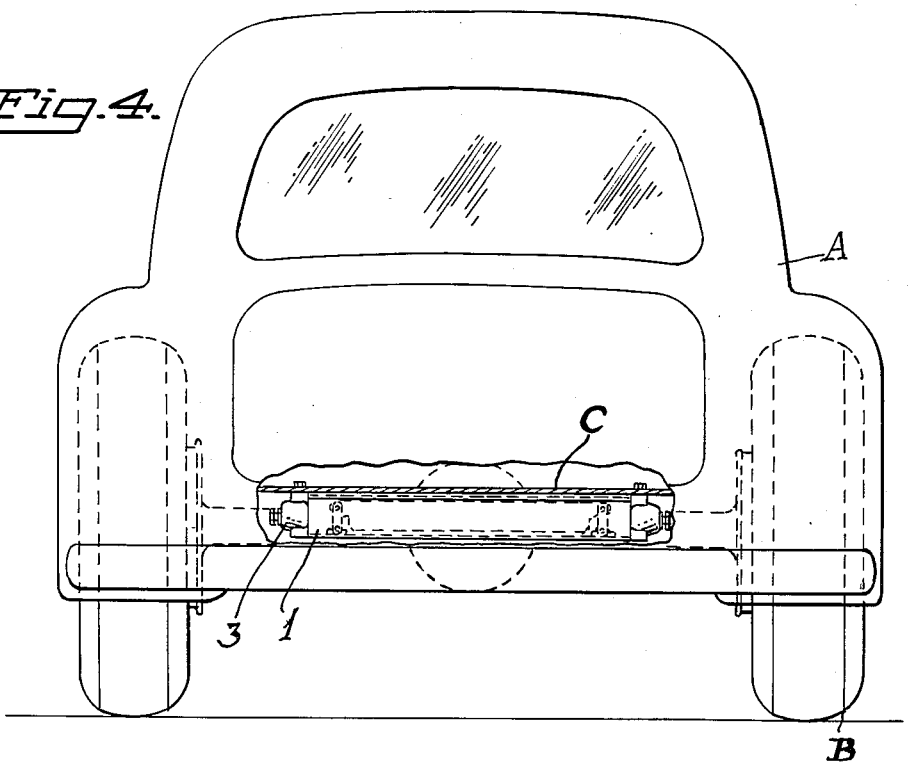
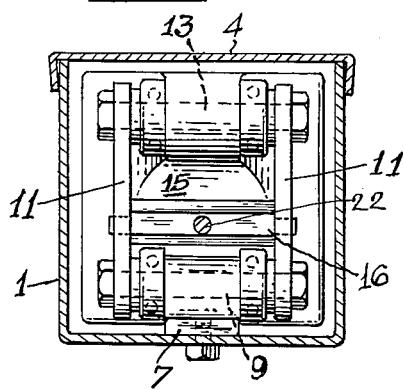
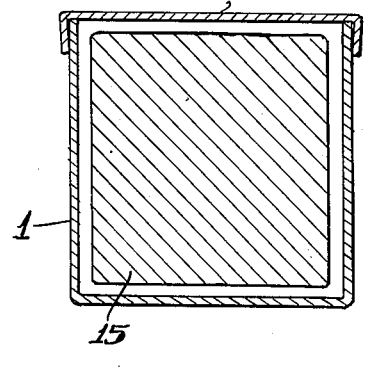
INVENTOR.
EDWARD C. HEARD
BY
*JE Trabucco*
ATTORNEY.

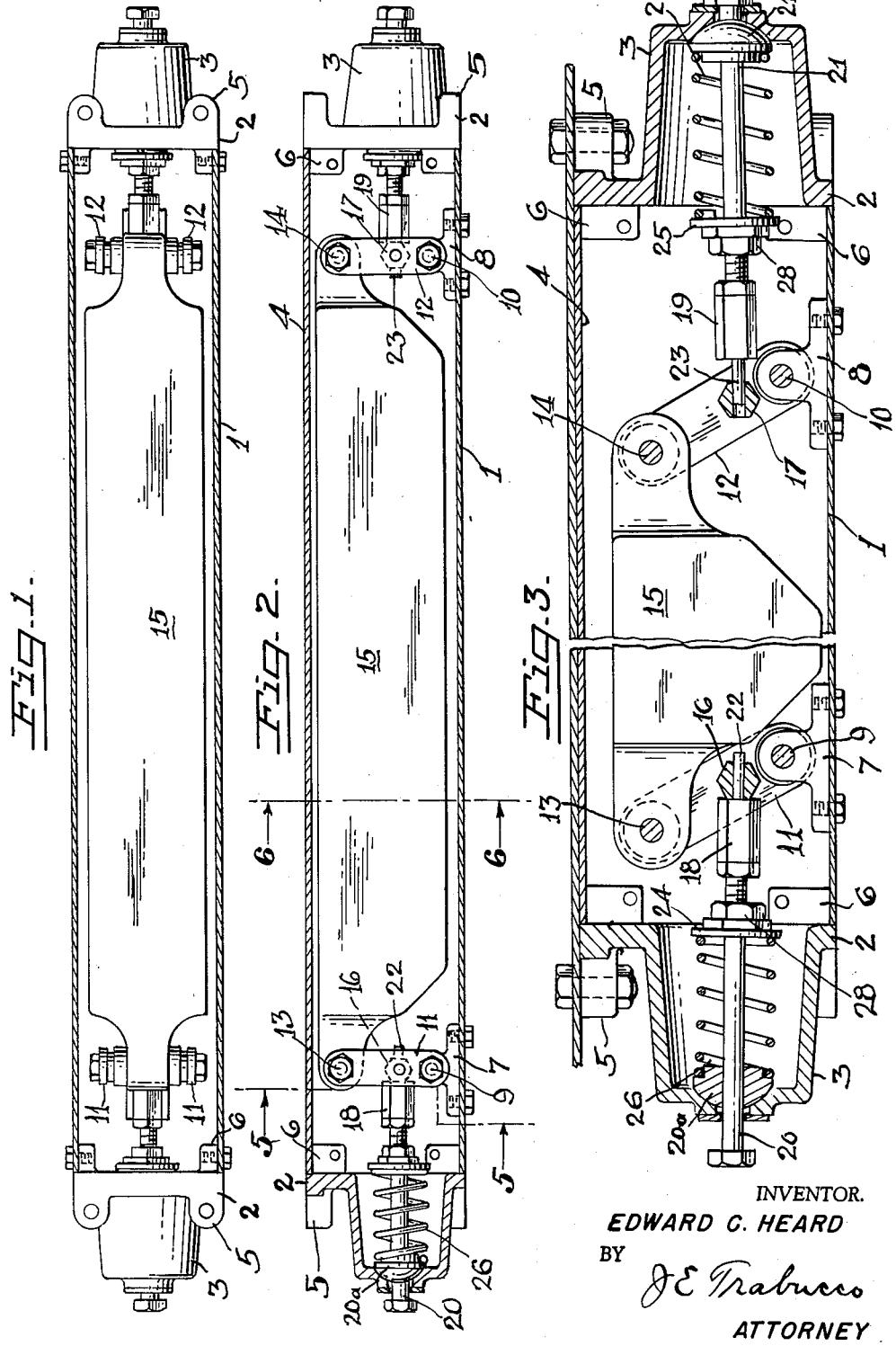

United States Patent Office 2,990,193
Patented June 27, 1961

2,990,193
AUTOMOBILE STABILIZER
Edward C. Heard, Carmel, Calif.
(42k Court St., Reno, Nev.)
Filed Apr. 29, 1958, Ser. No. 731,765
5 Claims. (Cl. 280—150)

This invention relates to an automobile stabilizer or anti-skid device of the type adapted to counteract centrifugal skidding.

The trend in automobiles over the past few years has resulted in a substantial increase in the horsepower of the motor, but safety facilities to compensate for increased speeds have lagged far behind. Increasing the horsepower and the potential speed of an automobile adds to the hazard of centrifugal skidding. A large percentage of highway accidents involve skidding, and frequently because of icy pavements or other similar surface conditions such accidents are sometimes unavoidable. While safety devices of various kinds have been devised with a view of reducing automobile accidents, little success has heretofore been accomplished in the way of automatically controlling a vehicle to avoid centrifugal skidding.

With a view of providing an effective safety control and thereby reducing the number of highway accidents, I have invented a novel automobile stabilizer which is capable of functioning automatically to reduce or prevent skidding by counteracting the centrifugal or sideways movement of the rear end of a forwardly moving automobile when its front end is turned abruptly to the right or left. The stabilizer is mounted on the rear end of the vehicle in a transverse position rearwardly of the rear wheels, and whenever in skidding such rear end pivots about the front wheels and shifts suddenly to the right or left during the forward movement of the vehicle, the stabilizer reacts automatically to apply a compensating force immediately in the opposite direction, thereby retarding or entirely stopping such skidding movement. The stabilizer responds with reaction to displaced weight, thereby functioning automatically to impart a controlling force, which is of considerable assistance in driving over curved highways.

One of the disadvantages of anti-skid devices of the kind used prior to this invention is that exceptionally heavy weights are required to counteract the skidding movement of many of the larger automobiles now in use. In recent years with automobiles being equipped with heavier frames, engines, and bodies, the added weight has required the use of correspondingly heavier anti-skid equipment effectively to counteract centrifugal skidding.

The present invention provides a novel anti-skid device which makes it possible to employ a substantially lighter weight effectively to oppose and control the skidding movement of an automobile. My improved anti-skidding device is positioned well behind the rear axle of an automobile in an advantageous position wherein the leverage counteracting the centrifugal skidding movement of the automobile is increased. In addition, the effective counteracting force exerted by the weight is materially increased and compounded by means of upright pivoted lever arms supporting the weight at their upper ends and arranged in combination with spring loaded fulcrum members positioned well below the pivotal connection of the lever arms with the weight and in positions opposing the pivotal movement of the lever arms when the weight is displaced in skidding.

An object of this invention is to provide an automobile stabilizer which functions automatically to apply a counteracting force in the opposite direction to the rear end of an automobile when in centrifugal skidding such rear end abruptly shifts to the right or left.

Another object of this invention is to provide an automobile stabilizer which is capable of increasing the traction of the rear automobile wheels with respect to the ground and at the same time reducing vibrations when travelling over uneven roadways.

Still another object of this invention is to provide an automobile stabilizer of the kind characterized, one which makes it possible more effectively to maintain an automobile under control when rounding curves and when making abrupt turns.

Other and further objects of my invention will be pointed out hereinafter, or will be indicated in the appended claims, or will be obvious to one skilled in the art upon an understanding of the present disclosure. For the purpose of this application, I have elected to show herein certain forms and details of an automobile stabilizer which is representative of my invention; it is to be understood, however, that the embodiment of my invention herein shown and described is for purposes of illustration only, and that therefore it is not to be regarded as exhaustive of the variations of the invention in the art.

In the accompanying drawings:

FIG. 1 is a top plan view of an automobile stabilizer embodying my invention, showing the enclosing casing with the cover removed;

FIG. 2 is a side elevational view of the stabilizer, showing the casing in section;

FIG. 3 is a longitudinal, vertical, sectional view on an enlarged scale of the stabilizer, showing the positions of the parts of the device when exerting a counteracting force to the right as the rear end of the supporting automobile shifts to the left when skidding;

FIG. 4 is a rear view of an automobile, showing the stabilizer mounted thereon;

FIG. 5 is a sectional view taken on the line 5—5 of FIG. 2; and

FIG. 6 is a sectional view taken on the line 6—6 of FIG. 2.

The stabilizer embodying my invention is mounted in a substantially horizontal position on the rear end of an automobile A in a position behind the rear wheels B and transversely with respect to the longitudinal axis of such automobile. The stabilizer may be conveniently mounted on the automobile in various ways, as by bolting it to the trunk floor C, as shown in the drawings, or by attaching it by straps or other means to the automobile frame.

The stabilizer comprises an elongated casing or other suitable supporting structure 1 having its ends provided with end members 2 of similar shape and construction, which are formed with outwardly extending frusto-conical shaped spring housings 3. The top of the casing is normally closed by a cover plate 4, and the end members 2 are provided with upper and lower outwardly disposed pairs of apertured lugs 5 for mounting the stabilizer on the automobile when bolts are used. The stabilizer casing 1 which has an approximate over-all length of twenty-six (26) inches, more or less, is U-shaped in cross-section, and it is preferably secured to the end members 2 by screws which extend into threaded openings provided in a number of inwardly disposed lugs 6 formed on the end members.

Secured to the lower side of the stabilizer casing and similarly positioned with respect to the ends thereof are two (2) upstanding bearing supports 7 and 8, which respectively support lower transverse shafts or pivot pins 9 and 10, such shafts or pins being positioned substantially at right angles to the longitudinal axis of the casing. Secured to the ends of the pivot pins 9 and 10, respectively, are pairs of links or lever arms 11 and 12 of suitable, uniform length which in their normal positions are substantially vertical. The upper ends of the pairs of lever arms 11 and 12 are secured to upper transverse shafts or pivot pins 13 and 14, respectively, such shafts or pins extending through horizontal transverse openings in the ends of an elongated weight 15 of iron, lead, or the like. Assuming, as an example, that the automobile on which the stabilizer is mounted weighs fifteen thousand (15,000) pounds, more or less, the weight of the weight 15 will preferably be about fifty (50) pounds, and the position thereof will be between fifteen (15) feet and seventeen (17) feet rearwardly of the front automobile wheels. The weight 15 is supported at its ends at points adjacent its upper side with the greater proportion of its mass being suspended between and below the upper transverse pins 13 and 14. The pivot pins 9, 10, 13, and 14 are mounted for pivotal movement in suitable bearings to reduce friction to a minimum. Rotatably mounted in similar positions about three (3) inches, more or less, below the upper pivot pins 13 and 14 and on and between the pairs of lever arms 11 and 12, respectively, are hexagonal or other suitably shaped fulcrum members 16 and 17, which are positioned above but near the lower pivot pins 9 and 10.

Normally positioned in abutting relationship with respect to the transverse fulcrum members 16 and 17, respectively, are adjustable pressure elements 18 and 19 carried on the inner threaded end portions of oppositely inclined rods 20 and 21 extending longitudinally with respect to the casing. The elements 18 and 19 carry inwardly protruding pins 22 and 23, respectively, the said pins slidably fitting in transverse openings in the fulcrum members 16 and 17. The rods 20 and 21 slidably extend through self-adjusting bushings 20a and 21a, respectively, and through over-size openings in the outer ends of the frustro-conical shaped spring housings 3, and each rod is preferably formed with an enlarged head at its outer end. The bushings are formed with semi-spherical outer ends which closely fit in concave sockets in the ends of the frustro-conical shaped spring housings 3. Held under suitable compression between the bushings 20a and 21a and discs 24 and 25 mounted on the rods 20 and 21, respectively, are similar strong die-type helical compression springs 26 and 27, which are pre-set to provide equalizing forces normally. The weight 15 is held in its normal position in the casing by the equally stressed springs 26 and 27 exerting uniform pressures inwardly upon the pairs of lever arms 11 and 12. The discs 24 and 25 are held against inward displacement with respect to the rods 20 and 21 by adjustable nuts 28 on the threaded end portions of the rods, these nuts providing means to adjust the springs to equalize the normal pressures exerted thereby. The fulcrum members 16 and 17 are mounted on the lever arms 11 and 12 in corresponding positions near the lower pivot pins 9 and 10 and about three (3) inches, more or less, below the upper pivot pins 13 and 14, thereby compounding the working force so it is equal to approximately three (3) times the weight of the fifty (50) pounds weight 15, or equivalent to one hundred and fifty (150) pounds, more or less.

It will be noted that the spring 26 opposes the displacement of the weight to the left, and the spring 27 opposes the displacement of such weight to the right (FIG. 3). Such displacement occurs because of the inertia of the weight if the vehicle skids, and such skidding movement will be opposed by the weight and the springs. The stabilizer operates in accordance with three (3) natural laws. First, the law of the lever, the automobile pivoting at the front wheels and the stabilizer being mounted fifteen (15) feet to seventeen (17) feet rearwardly therefrom. Second, the law of inertia—every action has a counteraction. Third, the law of gravity.

The fifty (50) pounds weight 15 mounted on the upper ends of the lever arms 11 and 12, because of the force of gravity, does not remain stationary, but with the slightest sideways movement of the rear end of the automobile, the weight moves in the opposite direction, such movement being effected by reason of the connection of the lower pivot pins 9 and 10 to the casing 1, which is attached to the automobile. If the springs 26 and 27 were positioned in opposing relation at the top side of the weight 15, the force exerted by the latter would be only fifty (50) pounds. However, each inch that the fulcrum points are lowered the weight is substantially compounded. Hence, in the arrangement illustrated with the fulcrum members 16 and 17 being positioned three (3) inches, more or less, below the upper pivot pins 13 and 14, the working force of the weight 15 is equivalent to about one hundred and fifty (150) pounds. Since the tension of the springs 26 and 27 is uniform, the slightest movement of the rear end of the automobile to the right or left when the front wheels are turned causes the weight 15 to move in the opposite direction and then pulsate back and forth through the action of the springs to provide the stabilizing effect required to provide balance. It is well known that an automobile when travelling forwardly in a straight line is balanced, but in the event a sharp turn is made and the rear end of the automobile starts to skid, say, to the left, a counteracting pressure of as small as fifty (50) pounds on the rear end in the opposite direction to the right will stop such skidding. The stabilizer comprising the present invention functions automatically to apply a counteracting force on the rear end of the automobile when such rear end shifts to the right or left in skidding. It is preferable that the applied weight should be one per cent (1%) or more of the total automobile weight. Hence, one hundred and fifty (150) pounds of working weight is provided by compounding a three-to-one (3/1) ratio, more or less, on the fifty (50) pounds weight 15, such working force being sufficient to control or stabilize a fifteen thousand (15,000) pound automobile.

What I claim is:

1. In an automobile stabilizer, an elongated casing adapted to be mounted horizontally on the rear end of an automobile behind the rear axle in a transverse position with respect to the longitudinal axis of such automobile, longitudinally spaced bearing supports mounted at opposite ends of the casing, lower transverse parallel pivot pins mounted on the bearing supports at substantially right angles to the longitudinal axis of the casing, an upstanding laterally spaced pair of lever arms secured at their lower ends to each of the lower pivot pins, upper transverse parallel pivot pins mounted on the upper ends of the pairs of lever arms, an elongated weight mounted at its ends on the upper pivot pins, fulcrum members mounted in corresponding positions on the pairs of lever arms at points below the upper pivot pins, longitudinal rods having inner end portions slidably extending through the fulcrum members and outer end portions slidably extending through the ends of the casing, pressure members carried on the rods and arranged in abutting relation to the fulcrum members, fixed spring abutments on the rods, and compression springs normally having substantially uniform compressions interposed between the ends of the casing and the fixed abutments on the rods.

2. In an automobile stabilizer, an elongated casing adapted to be mounted horizontally on an automobile behind the rear axle in a transverse position with respect to the longitudinal axis of such automobile, longitudinally spaced bearing supports mounted at opposite ends of the casing, lower transverse pivot pins mounted in parallel relation on the bearing supports and arranged at substantially right angles to the longitudinal axis of the casing, upstanding laterally spaced pairs of lever arms secured at their lower ends to the lower pivot pins, upper transverse parallel pivot pins mounted on the upper ends of the pairs of lever arms, and arranged in parallel relation to the lower pivot pins, an elongated weight mounted on the upper pivot pins, fulcrum members mounted on the pairs of lever arms and positioned above but adjacent the lower pivot pins, longitudinal rods mounted for sliding endways movement in the casing, the inner ends of the rods having pressure members normally abutting the fulcrum members, and uniformly compressed springs urging the rods inwardly toward each other.

3. In an automobile stabilizer, an elongated supporting structure adapted to be mounted in a transverse position on the rear end of an automobile at substantially right angles to the longitudinal axis of such automobile, longitudinally spaced bearing supports mounted at opposite ends of the supporting structure, upstanding lever arms pivotally mounted at their lower ends on the bearing supports and arranged for swinging movement about pivots at right angles to the longitudinal axis of the supporting structure, an elongated weight pivotally mounted on the upper ends of the lever arms, fulcrum members secured to and positioned in uniform positions on the lever arms between the upper and lower ends thereof, longitudinally reciprocable members mounted at opposite ends of the supporting structure and arranged in abutting relation with respect to the fulcrum members, and substantially uniformly compressed springs urging the reciprocable members toward the fulcrum members.

4. In an automobile stabilizer, an elongated supporting structure adapted to be mounted on a vehicle behind the rear axle in a transverse position at substantially right angles to the longitudinal axis of such vehicle, bearing supports mounted in longitudinally spaced relation on the supporting structure, normally upright lever arms pivotally mounted at their lower end on the bearing supports and arranged for swinging movement about pivots positioned transversely with respect to the longitudinal axis of the supporting structure, a weight pivotally carried on the upper ends of the lever arms, fulcrum members carried in corresponding positions by the lever arms and arranged well below the upper ends of such arms, reciprocable rods positioned longitudinally at opposite ends of the supporting structure, pressure members carried by the rods and normally engaging with the fulcrum members, and uniformly compressed springs urging the rods inwardly whereby the pressure members are normally in compressed engagement with the fulcrum members.

5. In an automobile stabilizer adapted to be mounted horizontally in a transverse position on the rear end of an automobile, at substantially right angles to the longitudinal axis of said automobile, a supporting structure, longitudinally spaced bearing supports mounted at opposite ends of the supporting structure, a pair of lever arms each having one end pivotally connected to one of said bearing supports, the axes of said pivotal connections extending at right angles to the longitudinal axis of said supporting structure, a weight pivotally connected to the other ends of said lever arms, the axes of said pivotal connections also extending at right angles to the longitudinal axis of said supporting structure, and a pair of springs each having one end bearing against said supporting structure and having means at its other end operatively connected to one of said lever arms at a point between its ends and adjacent the pivotal connection to its bearing support, said springs being under compression and exerting equalized pressures in opposite directions on said lever arms.

References Cited in the file of this patent

UNITED STATES PATENTS 2,635,898    Silverman    Apr. 21, 1953

FOREIGN PATENTS 1,092,489    France    Nov. 10, 1954